Figure 1:
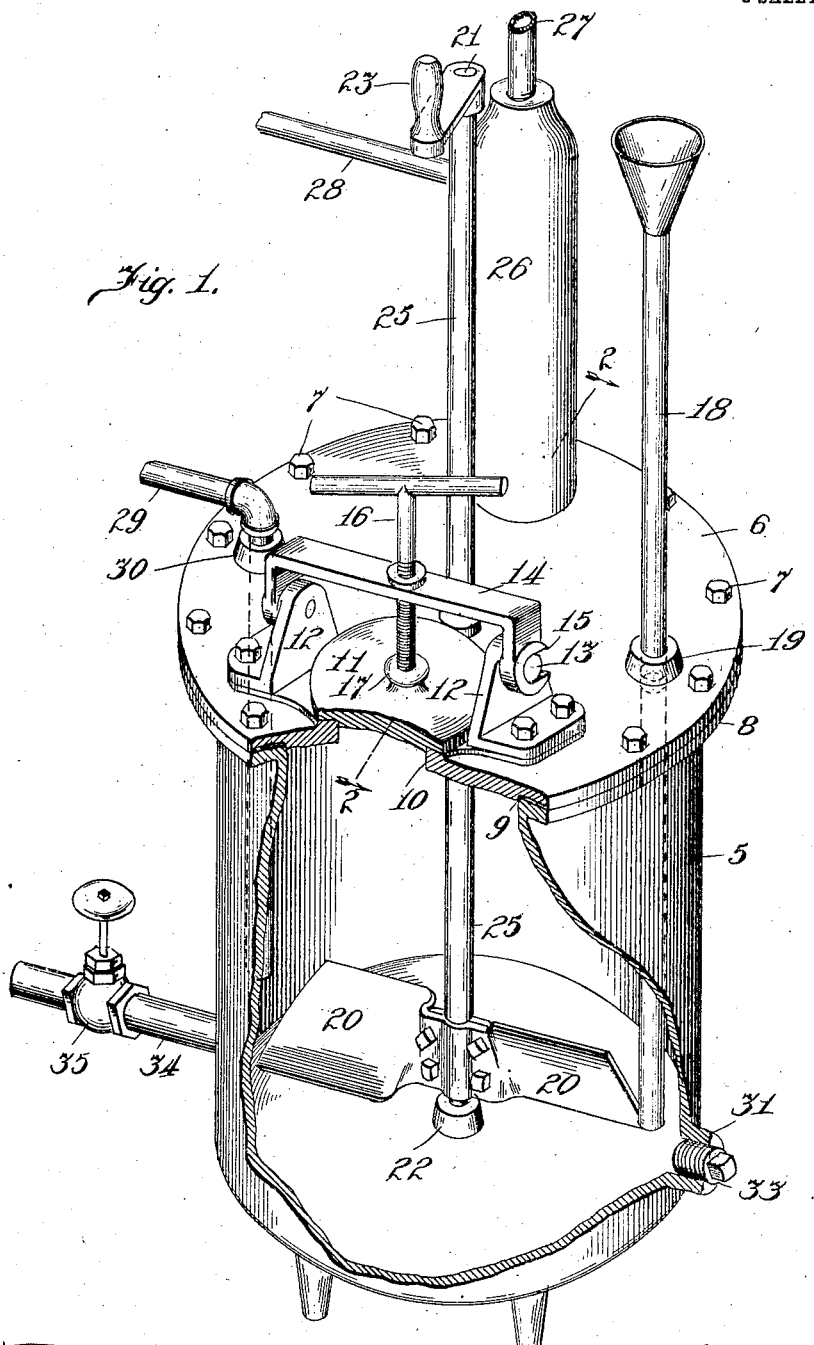

H. W. JACOBS & H. H. LANNING.
GAS GENERATOR.
APPLICATION FILED JUNE 24, 1912.

1,062,712.

Patented May 27, 1913.

2 SHEETS—SHEET 1.

Witnesses
Milton Lenoir
R. E. Wighton.

Inventors
Henry W. Jacobs,
Howard H. Lanning,
Heidman Street, Attorneys.

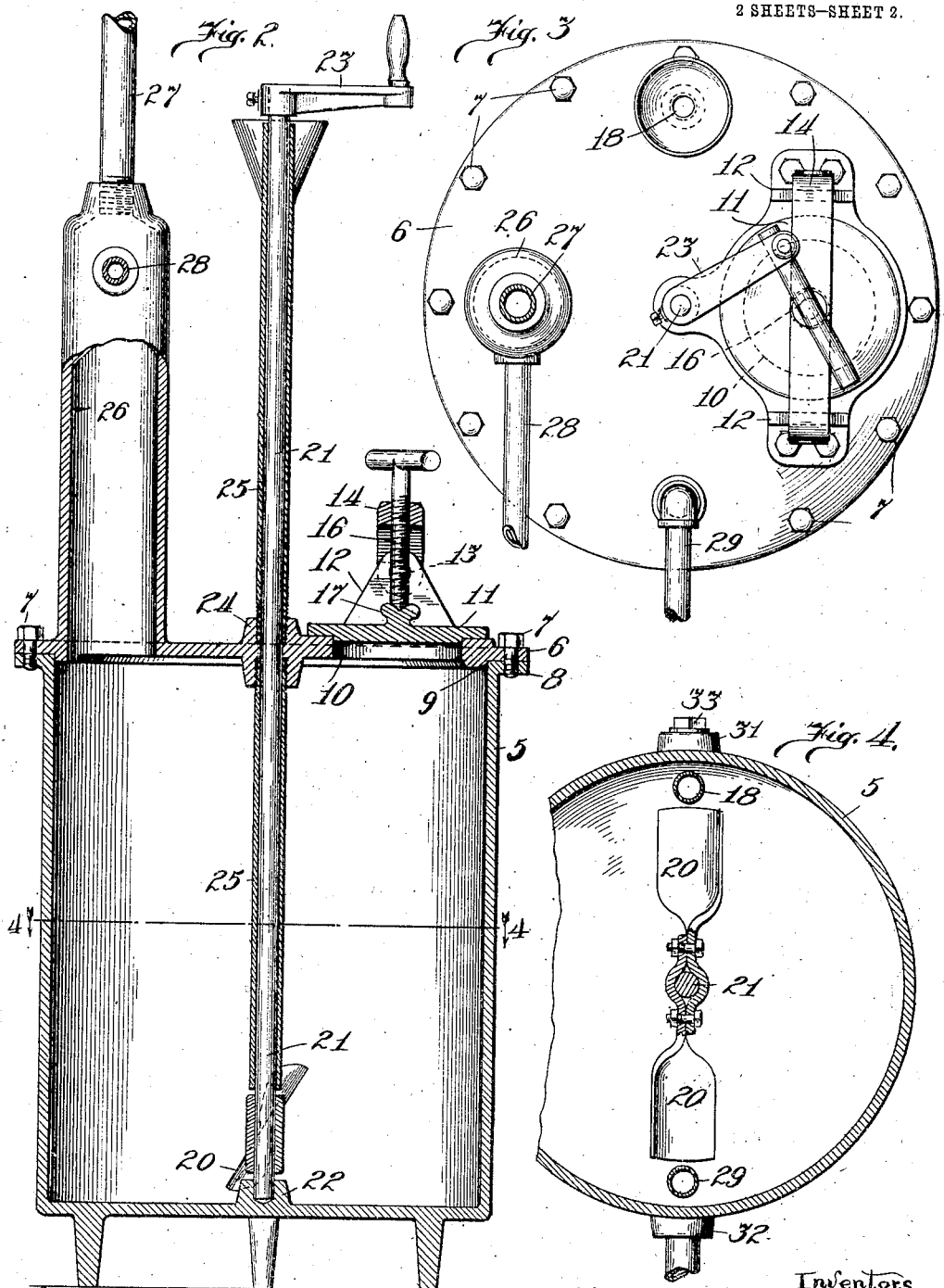

UNITED STATES PATENT OFFICE.

HENRY W. JACOBS AND HOWARD H. LANNING, OF TOPEKA, KANSAS.

GAS-GENERATOR.

1,062,712.

Specification of Letters Patent.

Patented May 27, 1913.

Application filed June 24, 1912. Serial No. 705,646.

*To all whom it may concern:*

Be it known that we, HENRY W. JACOBS and HOWARD H. LANNING, of Topeka, in the county of Shawnee and State of Kansas, have invented a certain new and useful Improvement in Gas-Generators, of which the following is a description, reference being had to the accompanying drawings, which form a part of our specification.

Our invention relates to gas generating devices wherein the gas is produced by chemical reaction; the chemicals or reagents used being preferably of a nature capable of reduction to a liquid or semi-liquid form by solution or suspension in water, or by any other suitable process.

The object of our invention is to produce a generator in which the gas can be generated with the greatest possible degree of safety as well as with economy and convenience.

Our invention is especially adapted for use in the production of oxygen from bleaching powder or calcium oxychlorid, although the generator is applicable for use in the production of other gases such as chlorin, hydrogen, hydrogen sulfid, carbon dioxid, etc., which can be produced by the reaction or interaction of two or more substances in the presence of water or some other suitable liquid.

In the drawings: Figure 1 is a perspective view of our improved generator with a portion of the side wall broken away in order to show the interior construction and relation of the parts. Fig. 2 is a vertical sectional view taken on the line 2—2 of Fig. 1 and looking in the direction of the arrows; a portion of the dome or gas chamber being shown in full lines. Fig. 3 is a top plan view of the same. Fig. 4 is a horizontal sectional view taken on the line 4—4 of Fig. 2, looking downward.

In the exemplification of our invention, the generator consists of a suitable receptacle 5, preferably cylindrical in shape and open at one end where it is provided with a cover 6 which is securely fastened thereto by a suitable number of bolts as shown at 7. The upper end of the receptacle 5 is provided with the flange 8 which receives the bolts 7. We prefer to form the cover with the off-set portion near the periphery thereof so as to form a suitable annular shoulder as at 9, thus also providing a seat for a gasket which may be interposed between the shoulder and the outer periphery of the cover in order to form a gas tight connection; although other suitable means may be employed for this purpose.

The cover 6 is provided with a suitable opening at 10, through which the charge is placed, and this charging opening is provided with a removable cover plate 11. In order to maintain the cover plate 11 in place and also form a tight connection, we provide the cover 6 with the lugs or brackets 12, 12, arranged on opposite sides of the opening 10. These lugs or brackets may be either integrally formed with the cover 6 or they may be securely bolted thereto as shown in the drawings. The upper end of each bracket 12 is provided with a suitable stud or pin 13 which is adapted to receive the ends of a yoke 14. The ends of the yoke 14 are preferably slotted as shown at 15 so that the yoke may be easily applied and quickly removed when it is desired. The yoke is provided with a clamping screw 16; the screw 16 being threaded through an opening in the yoke so that its relation to the yoke may be controlled. The lower end of the clamping screw 16 is intended to enter a socket formed in the boss or knob portion 17 of the cover plate 11.

It is evident from the construction shown and described that when the yoke 14 has been put into place on the pins 13 and brought into the upright or vertical position shown in the drawings, the cover plate 11 of the charging opening or hole 10 can be firmly clamped into place by turning the clamping screw 16 in the proper or clockwise direction. The generator is also provided with means whereby the generator may be charged during the process of generation without the loss of gas generated and which may have accumulated within the generator. This means is shown in the drawings in the nature of a funnel tube or charge pipe 18, the lower end whereof extends down into close proximity to the bottom of the receptacle 5. The upper or outer end of the tube or pipe is preferably funnel shaped as shown, so as to provide a convenient form whereby the proper chemicals or reagents, either in solution or in liquid form, can be introduced into the generator at suitable intervals while the latter is in operation. In order to insure a gas tight connection at the point where the pipe 18 passes through the cover 6, we prefer to provide the cover with a suitable boss 19. We prefer to provide a boss 19 on opposite sides of the cover, with a threaded opening extending therethrough; while the pipe 18 is preferably made in two sections, the ends whereof are screw threaded so as to permit their being screwed into the bosses 19 on opposite sides of the cover. The bosses 19 are preferably formed integral with the cover 6 or otherwise secured thereto so as to provide a gas tight connection. With the lower end of pipe 18 extending into proximity to the bottom of the receptacle and therefore beneath the normal level of the fluid contents or water level in the receptacle or generator, it will be impossible for the generated gas to find exit through the pipe 18, as the water, under proper operating conditions, will form a water seal in pipe 18 and prevent the escape of gas from the generating chamber therethrough.

The receptacle is provided with a suitable agitator, which is preferably shown composed of two suitably twisted paddles 20, 20, which are firmly clamped to the lower end of a vertical staff 21. The staff 21 is seated at its lower end in a socket, which may be provided by the boss 22 formed on the bottom of the receptacle; while the upper end of the vertical staff extends through a proper opening, preferably arranged in the center of the cover 6, and is provided at the upper outer end with a suitable crank 23.

In order to prevent the escape of gas from the receptacle at the point where the vertical staff 21 passes through the cover 6, we prefer to provide the cover with suitable bosses as at 24, see Fig. 2, which are preferably integral with both sides of the cover; the bosses 24 being provided with threaded openings extending therethrough, as shown in Fig. 2. The vertical staff 21 is incased by the sectional tube or elongated sleeve 25, the ends whereof are screwed into the bosses 24 as clearly shown in Fig. 2. The lower section of the encasing or sleeve 25 extends down to a point in proximity to the paddles 20. The upper or outer section of the tube 25 is shown extending up to the crank on the end of the staff; this section will provide suitable bearing for the extended vertical shaft 21 and facilitate the operation of the agitator.

The paddles 20, 20, are arranged so as to present their forward lower edges in opposite directions, as clearly shown in Fig. 1, so that in the operation of the agitator the lower edge of each paddle will be presented forwardly as is clearly evident, thereby compelling the material within the reservoir to glide or flow upwardly over the face of the paddles and become thoroughly stirred. The cover 6 is also provided with a dome or gas chamber 26, which is preferably cylindrical in form as shown and may either be made integral with the cover or otherwise secured thereto. The dome interior or chamber practically constitutes a continuation or extension of the chamber of the generator portion or receptacle 5, as clearly shown in Fig. 2, and permits the generated gas to rise and collect in the dome or gas chamber 26.

The upper part of the dome or gas chamber 26 is provided with a pipe or conduit 27, whereby the gas is conveyed to the place where it is to be used or consumed. The conduit or pipe 27 is preferably connected with the top of the dome as shown, thus conveying the gas from the uppermost point in the dome. The dome 26 is also preferably provided with a conduit or pipe 28 which enters the dome at the side and in proximity to the top thereof. Both pipes or conduits 27 and 28 may be permanently connected to the dome. Pipe 28 is intended to be connected with a source of water supply. The generator is also shown provided with a conduit or pipe 29 which passes through a suitable opening in the cover 6 and down into the generator toward the bottom thereof, see Fig. 1. The pipe 29 may also be made in two parts or sections similar in manner to sleeves 25, with the two parts screwing into a suitable boss 30, which may be integral with one or both sides of the cover 6, with a threaded opening extending therethrough. Pipe 29 may be connected with a suitable source of steam supply, thus permitting steam to be used in the proper tempering or heating of the water or contents of the generator when conditions require.

The bottom of the receptacle or generator tank 5 is provided with suitable outlets as at 31 and 32; the opening 31 being shown closed by a suitable screw plug 33, while opening 32 is provided with a drain pipe 34 which is provided with a suitable cock as at 35. The contents of the generator may be drained through pipe 34, allowing the residue, remaining after all the gas contained in the charge has been secured or generated, to be discharged and the generator cleaned of the remaining impurities.

In the use of our invention, a suitable quantity of water is fed into the generator through the pipe 28. The water in practice must be heated to a proper temperature in order to obtain the desired result; and if the water which is fed through pipe 28 has not previously been heated, before allowing it to flow into the generator, then the water within the generator may be heated to the desired temperature by admitting steam through pipe 29. After the water has been heated to the desired temperature, a suitable charge of chemicals is then introduced through the charging hole or opening 10. The cover plate 11 is then put into place and securely clamped down by the clamping mechanism shown in the drawings as consisting of the yoke 14 and clamping screw 16.

A proper reagent solution or catalyzer is then introduced into the reservoir 5 in order to facilitate the interaction or proper chemical action between the previously introduced matter in the reservoir. This catalyzer is introduced through the charge or funnel pipe 18 which discharges the solution near the bottom of the reservoir and induces the chemical reaction desired whereby the gas is liberated.

Having introduced the water, which has been heated to the desired degree of temperature, then provided the reservoir with a suitable charge of chemicals, which will permit of the proper reaction or interaction to liberate the desired gas, and having supplied a suitable charge of a solution for inducing catalytic action, the generation is enhanced through the operation of the agitator which is brought about by the turning of crank 23 in the proper direction whereby the paddles 20, 20 will thoroughly stir or agitate the substance within the reservoir 5.

In practice, it has been found desirable to feed the catalyzer at intervals in comparatively small quantities and as frequently as possible without, however, causing the gas to be evolved or generated faster than it can be taken away; because too great an introduction of the solution inducing catalytic action would produce excess pressure within the generating chamber, which would force the contents of the generator up through the charge or funnel pipe 18 and cause an overflow from the top. If desired, both steam and fresh water may be admitted while reaction is going on, should it be found necessary.

By arranging the charge or funnel pipe 18 in the manner previously described with the lower end open near the bottom of the reservoir 5 and the upper end open to the atmosphere as shown, it serves a double purpose; first, it will act as a safety valve to relieve any excess pressure,—which is usually caused by feeding the catalyzer or reagent solution too rapidly,—by permitting an overflow of the contents at the funnel or upper end thereof; and second, it makes it impossible to introduce any more of the reagent solution or catalyzer through the charge or funnel pipe 18 until the excess pressure has been relieved. In practice, the feeding of the catalyzer is continued until gas can no longer be secured or generated from the charge within, after which the contents of the generator may be drained out by opening the cock 35 in the discharge pipe 34; it being understood of course, that the generated gas which may have collected in the dome or chamber 26 has been previously allowed to flow through pipe 27 to the point of use. As the pipes 18 and 29 extend to points in proximity to the bottom of the generator, their lower orifices will be beneath the normal level of the fluid contents within the generator, so that a water seal will be provided in these pipes, preventing the outward flow of gas therethrough. The reason for having the water pipe 28 discharge into the upper part of dome 26 is that the inflowing water will rinse down any sludge or sediment that may collect on the sides of the dome through the action of the rising gas. The water flowing into the dome will prevent the scale or sediment from solidifying in the dome and choking up the passage or discharge opening through which the gas flows from the generator. If desired, however, the generator might be filled with water through the charging opening or orifice 10 in the cover 6; and instead of using steam to heat the contents within the generator, the water may be previously heated before introducing the same into the generator; or it may be desirable under some circumstances to supply the desired heat and water by other means, as for example through the proper heating of the generator by means of a furnace or flue which may be included in the construction of the generator.

We have shown and described the preferred form of our invention, but it is evident that the same may be altered in a number of details without, however, departing from the spirit of our invention. We do not wish, therefore, to be understood as limiting ourselves to the exact construction shown and described, but

What we claim as our invention, and wish to secure by Letters Patent, is:—

1. A gas generator, comprising a liquid retaining receptacle, a removable cover secured to the open end of the receptacle, the cover being provided with a charge-receiving orifice, a gas-receiving chamber located above the cover, and means whereby the contents of the receptacle may be agitated.

2. A gas generator, comprising a liquid retaining receptacle, a charge-receiving orifice provided in the upper part thereof, means whereby the orifice may be closed and a gas tight joint maintained, a gas-receiving chamber located above said receptacle and communicating therewith, a conduit communicating with the upper part of said gas-receiving chamber and adapted to be connected with a source of water supply, and means whereby the contents of the receptacle may be agitated.

3. A gas generator, comprising a generator provided with a removable top, said top being provided with a charge-receiving orifice, means whereby said orifice is closed and a gas tight joint maintained, a gas chamber arranged on said removable top and communicating with the generator interior, a conduit for conveying water to said generator, and means whereby the contents of the generator may be agitated.

4. A gas generator, comprising a generator provided with a removable cover, said cover being provided with a charge-receiving orifice, means whereby said orifice is closed and a gas tight joint maintained, a gas receiving chamber communicating with the upper portion of the generator, a conduit for conveying water into the generator, means whereby the contents of the generator may be heated, and means for agitating the contents of the generator.

5. A gas generator device of the class described, comprising a generator provided with a charge receiving orifice, means whereby said orifice is closed and a gas tight joint maintained, a gas-receiving chamber communicating with the upper part of the generator, a water conveying conduit communicating with the upper part of the gas-receiving chamber, an agitator revolubly mounted within the generator, and a conduit for conveying a heat imparting medium into said generator.

6. A gas generator, comprising a liquid retaining receptacle, means whereby water may be conveyed to the receptacle, means whereby a gas producing compound may be introduced into the receptacle, means whereby a catalyzer solution may be intermittently introduced into the receptacle and excess pressure relieved, and means whereby the contents may be agitated and reaction enhanced.

7. A gas generator, comprising a liquid retaining receptacle adapted to be made gas tight, means whereby a gas producing compound may be introduced into the receptacle, means extending into the lower part of the receptacle whereby a chemical reagent may be intermittently introduced into the receptacle and excess pressure in the receptacle relieved, means whereby the contents of the receptacle may be heated, and means whereby the contents may be agitated and reaction enhanced.

HENRY W. JACOBS.
HOWARD H. LANNING.

Witnesses:
GEORGE HEIDMAN,
NORMAN A. STREET.